United States Patent [19]

Pollack et al.

[11] Patent Number: 4,571,472
[45] Date of Patent: Feb. 18, 1986

[54] DEVICE FOR INDUCTION WELDING

[75] Inventors: Zoltan Pollack; Bengt Svärd, both of Lund, Sweden

[73] Assignee: AB Akerlund & Rausing, Sweden

[21] Appl. No.: 685,485

[22] Filed: Dec. 24, 1984

[30] Foreign Application Priority Data

Jan. 24, 1984 [SE] Sweden ............................... 8400345

[51] Int. Cl.⁴ ............................................... H05B 6/40
[52] U.S. Cl. .................................. 219/9.5; 219/10.43; 219/10.49 R; 219/10.53; 219/10.79; 156/380.2; 156/274.2
[58] Field of Search ...................... 219/10.53, 10.49 R, 219/10.43, 9.5, 10.79, 10.67; 373/157; 156/379.6, 379.7, 380.2, 274.2

[56] References Cited

U.S. PATENT DOCUMENTS

| | | | |
|---|---|---|---|
| 1,859,680 | 5/1932 | Neuhauss | 373/157 |
| 2,090,692 | 8/1937 | Melton | 219/10.49 R |
| 3,462,336 | 8/1969 | Leatherman | 219/10.53 X |
| 3,651,299 | 3/1972 | O'Neill | 219/10.53 |
| 3,705,284 | 12/1972 | Binard | 219/10.49 R |
| 3,727,022 | 4/1973 | Hamilton | 219/10.43 |
| 3,754,109 | 8/1973 | Moulin et al. | 219/9.5 |
| 3,808,074 | 4/1974 | Smith et al. | 219/10.43 X |

Primary Examiner—Philip H. Leung
Attorney, Agent, or Firm—Lerner, David, Littenberg, Krumholz & Mentlik

[57] ABSTRACT

A device for induction welding is provided according to the teachings of the present invention. The device comprises an electrically conducting arrangement for creating a magnetic field. A layer comprising essentially non-magnetic, electrically conducting particles in a support matrix of an electrically non-conducting material is also provided and arranged for modifying the magnetic field such that the available energy may be collected in the welding area (areas).

9 Claims, 2 Drawing Figures

DEVICE FOR INDUCTION WELDING

FIELD OF THE INVENTION

The present invention relates to a device for induction welding of constructional elements having an electrically conducting material in the area of the welding region and a material which is sealable by heat and subsequent cooling. The material is at least on one of the two surfaces which are to be interconnected by welding. More precisely the invention relates to a device having means for modifying a magnetic field or magnetic flow created by a high frequency electric current in an electric conductor, for instance a loop or a straight conductor, in the device. Said means for modifying the magnetic field basically is of the type that accomplishes shielding of that area or the areas of an object to be welded which should not receive heat enerby, while in the welding area (areas) there is unhindered heat energy production by electric induction provided by the modified magnetic field.

BACKGROUND OF THE INVENTION

The basic problem of the invention is to provide an arrangement which modifies a high frequency magnetic field, is effective from an energy point of view and sets in a well defined manner to configure the areas which are to be "shielded". Furthermore, the arrangement should be easy to manufacture and operate.

In high frequency induction welding the need for directing a magnetic field from the "welding inductor" towards the welding areas and to shield other areas from magnetic fields that produce an electric current has been recognized.

In a known method a short circuited loop of electrically conducting material, for instance copper, is arranged around the area which is to be shielded from the magnetic field. The field/the magnetic flow induces current in the loop and this current produces a counteracting magnetic flow to reduce the net flow in the "shielded" area. This method, however, produces a heavy heat dissipation in the loop as a result of the induced current. The heat dissipation is such that considerable cooling is necessary when operating the welding tool at a production rate. Such a cooling imposes losses which cause deterioration in efficiency.

Another method employs the placement of ferro magnetic material having a high permeability, for instance soft iron, adjacent to the welding area (areas) for "collecting", in a known manner, the magnetic flow in the high permeability material. This principle is useful in low frequency applications, for instance power transformers, however in high frequency applications its usefillness is limited. The term "high frequency" in this particular application is intended to mean a frequency of an order of at least kHz, usually 10-50 kHz. Higher frequencies may also be used, especially when only small penetration depths are needed in the electrically conducting material in the welding area. A "concentration" of energy to small penetration depths, however, may result in burning through of the material. At very high frequencies the dielectric phenomena will also contribute to the end result.

OBJECTS OF THE INVENTION

The present invention is directed to providing an alternative to known induction welding methods. The arrangement according to the invention eliminates the extremely noticeable drawbacks of known devices and in addition turns out to be simple to manufacture and easy to handle.

SUMMARY OF THE INVENTION

The device according to the invention comprises an arrangement of an electrically conducting material that creates a magnetic field and directs the field against a welding area. The device is characterized by a layer for modifying the field comprising electrically conducting, essentially non-magnetic particles distributed in a support matrix formed of an electrically non-conducting material.

Preferably, the electrically conducting arrangement comprises a loop, and the modifying layer arranged inside the loop for shielding a predetermined area of the region inside the loop.

Preferably, the support matrix comprises a mouldable material, for instance an epoxy resin.

The amount of particles in the matrix varies depending on the actual application, but preferably the particles are present in the matrix in an amont of up to approximately 50 percent by weight.

The particle size may also vary, but as an example there may be mentioned particles of a size from about one micron to some ten microns.

Advantageously, the particles may consist of copper dust, carbon black or other electrically conducting material.

Figure 1:
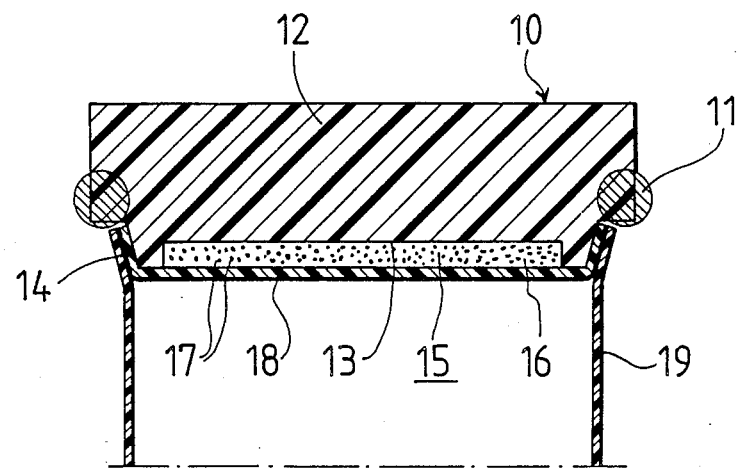
FIG. 1 in a cross-section and partial longitudinal section shows a welding tool according to the invention on a cover for a packaging container.
Figure 2:
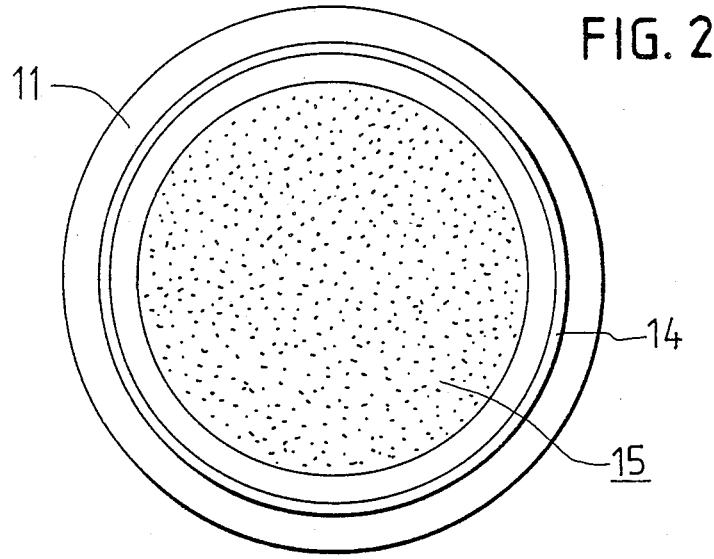
FIG. 2 shows an end view of the welding tool seen from the "powder shield side".

Basically, the welding tool comprises an electric conductor 11 of more or less circular closed form acting as a welding inductor for producing a magnetic field. The welding conductor 11 is bedded into, fully or partly, a body 12, preferably of a mouldable material, for instance an epoxy resin. Within the border edges of the loop there is formed a recess 13 down to a depth within the range of some millimeters and with an radially extreme outer edge also at a distance of some millimeters from the conical abutment portion 14 of the body 12.

In the recess 13 there is arranged a body 15 comprising a support matrix 16 and particles 17 supported therein. The support matrix is electrically non-conducting and preferably comprises of a mouldable material, for instance an epoxy resin. The particles are of an electrically conducting, essentially non-magnetic material, for instance copper or carbon black. The dimension of the particles is within the range from about one micron to some ten microns.

The conical abutment portion 14 of the tool 10 abuts internally the outer edge of a container cover 18 which is pressed against the inside of the top edge of a container casing 19 by the portion 14. The cover 18 comprises an external plastic layer, for instance of polypropylene, having a thickness of some hundred microns and a barrier layer of a metal material, for instance an aluminium foil, inside the plastic layer and of a thickness within the range of about 10 microns.

The conical end 14 of the welding tool 10 is inserted to an operative position and the welding area of interest thus comprises the region between the top of the container 19 and the upwardly directed flange over the cover 18.

The electric current in the welding inductor 14 creates, in a well known manner, a magnetic flow axially through the loop, and such flow basically oscillates at a frequency equal to the frequency of the electric current supplied to the loop. For some reason not explained in this context the flow, however, will not be sensed noticeably in the container cover in the area below the powder filled recess 13. Additionally, see the examples describing the short circuited electric conducting loop, the body 15 will not be heated noticeably—not even during a long term operation of the welding tool in a production line for sealing containers.

It may be observed that the magnetic flow from the welding inductor is shielded from other areas than the edge region of the container, i.e. the desired welding area. Seen from a qualitative point of view there is obtained a magnetic flow path for the actual magnetic flow (a frequency within the range of 30 kHz) which for reasons not explainable in the present context avoids the region of the powder loaded body.

Although the actual embodiment is directed to the heating of a ring-shaped welding area, it is realized that the principle of having a powder mass also may be used in other applications. The claims do indicate this.

We claim:

1. A device for induction welding comprising:
    conductor means for receiving current from a high frequency source and establishing a magnetic field in a defined area where articles are to be joined by virtue of heat generated in at least a conductive portion of said particles to be joined as a result of said magnetic field, said conductor means being positioned to produce said magnetic field in said defined areas as a result of current flowing therein; and
    a magnetic field modifying layer positioned intermediate at least portions of said conductor means and said defined area for interacting with said magnetic field and shielding a predetermined region of said defined area, said magnetic field conductive modifying layer taking the form of substantially nonmagnetic particles disbursed in a support matrix formed of electrically non-conducting material.

2. The device according to claim 1 wherein said conductor means takes the form of a conductive loop and said magnetic field layer is arranged within said loop for shielding a predetermined region of said defined area underlying said loop.

3. The device according to claim 2 wherein said support matrix is formed of a mouldable material.

4. The device according to claim 3 wherein said particles disbursed in said support matrix may be present in an amount of up to approximately 15 percent by weight.

5. The device according to claim 4 wherein said particles exhibit a size varying from approximately 1 micron to some 10 microns.

6. The device according to claim 5 wherein said particles may take the form of one of copper dust, carbon black or other electrically conducting material.

7. The device according to claim 2 wherein said conductor means includes at least a straight section of electric conductor.

8. The device according to claim 2 wherein said conductor means is disposed upon a non-conductive body defining at least one planar surface, said magnetic field modifying layer is disposed in said non-conductive body parallel to said at least one planar surface and said defined area is adjacent to at least a portion of said planar surface.

9. The device according to claim 8 wherein said non-conductive body is contoured to receive articles to be joined proximate to said planar surface, to place such articles in a sealing relationship and to subject portions of said articles which are not in a shielded relationship with said magnetic field modifying layer to said magnetic field established.

* * * * *

UNITED STATES PATENT AND TRADEMARK OFFICE
CERTIFICATE OF CORRECTION

PATENT NO. : 4,571,472

DATED : February 18, 1986

INVENTOR(S) : Zoltan Pollack, Bengt Svard

It is certified that error appears in the above-identified patent and that said Letters Patent is hereby corrected as shown below:

Column 1, line 18, "enerby" should read --energy--.
Column 1, line 26, "sets" should read --acts--.
Column 1, line 41, cancel the word "a".
Column 1, line 53, after "however" insert --,--.
Column 3, line 10, "examples" should read --example--.
Column 3, line 33, "particles" should read --articles--.
Column 4, line 2, cancel the word "conductive".
Column 4, line 4, after "magnetic" insert --conductive--.

Signed and Sealed this

Twenty-second Day of July 1986

[SEAL]

Attest:

DONALD J. QUIGG

Attesting Officer

Commissioner of Patents and Trademarks